United States Patent [19]

Degen et al.

[11] Patent Number: 4,882,056

[45] Date of Patent: Nov. 21, 1989

[54] FLUID FILTER ELEMENT WITH AN OVERLAPPED WRAP

[75] Inventors: Peter J. Degen, Huntington; Colin F. Harwood, Glen Cove, both of N.Y.

[73] Assignee: Pall Corporation, Glen Cove, N.Y.

[21] Appl. No.: 176,865

[22] Filed: Apr. 1, 1988

[51] Int. Cl.$^4$ .............................................. B01D 27/04
[52] U.S. Cl. ................................ 210/490; 210/497.1;
 210/497.2; 55/498; 55/520
[58] Field of Search ............... 210/437, 488, 489, 490,
 210/493.4, 497.01, 497.1, 497.2; 55/485, 486,
 498, 520; 156/191, 195, 196, 280; 427/244, 245;
 428/36

[56] References Cited

U.S. PATENT DOCUMENTS

| | | | |
|---|---|---|---|
| 930,401 | 8/1909 | Monteagle | 210/345 |
| 1,001,929 | 8/1911 | Collins | 210/90 |
| 2,064,511 | 12/1936 | Wells | 210/165 |
| 2,539,450 | 1/1951 | Magill | 210/497.01 |
| 3,061,107 | 10/1962 | Taylor | 210/487 |
| 3,241,680 | 3/1966 | Humbert | 210/457 |
| 3,397,793 | 8/1968 | MacDonnell | 210/457 |
| 3,442,392 | 5/1969 | Skelley | 210/491 |
| 3,578,175 | 5/1971 | Manjikian | 210/489 |
| 3,769,128 | 10/1973 | Manjikian | 156/185 |
| 3,904,798 | 9/1975 | Vogt et al. | 428/36 |
| 4,065,341 | 12/1977 | Cub | 55/498 |
| 4,101,423 | 7/1978 | Merrill et al. | 210/497.1 |
| 4,402,830 | 9/1983 | Pall | 210/497.1 |
| 4,594,202 | 6/1986 | Pall et al. | 264/8 |
| 4,692,196 | 9/1987 | Ellegood et al. | 156/187 |
| 4,728,901 | 2/1988 | Pall et al. | 210/496 |

FOREIGN PATENT DOCUMENTS

| | | | |
|---|---|---|---|
| 547695 | 11/1959 | Belgium | 210/497.2 |
| 724242 | 8/1942 | Fed. Rep. of Germany | 210/497.2 |
| 3513062 | 10/1986 | Fed. Rep. of Germany | 210/497.1 |
| 53-2390 | 1/1978 | Japan | 210/497.1 |
| 55-39279 | 9/1980 | Japan. | |

*Primary Examiner*—Richard V. Fisher
*Assistant Examiner*—Wanda L. Millard
*Attorney, Agent, or Firm*—Leydig, Voit & Mayer

[57] ABSTRACT

A fluid treatment element comprises a wrap spirally wound in successive overlapping windings about the external surface of a cartridge. The wrap has a portion contiguous to a portion of the external surface of the cartridge. A first adhesive is disposed between the external surface of the cartridge and the contiguous portion of the wrap. A second adhesive is disposed between overlapping windings of the wrap. An end cap is disposed over an end of the cartridge and is secured to the end of the cartridge and an end portion of the wrap. The fluid treatment element is applicable to various fields, including, for example, filtration, water demineralization, and gas treatment.

21 Claims, 1 Drawing Sheet

FLUID FILTER ELEMENT WITH AN OVERLAPPED WRAP

TECHNICAL FIELD

The present invention relates to a fluid treatment element. More particularly, the present invention relates to a fluid treatment element which is wound with a wrap.

BACKGROUND ART

The typical fluid treatment element may comprise a hollow, generally cylindrical, permeable cartridge and an end cap positioned on each end of the cartridge to direct a fluid, i.e., a gas or a liquid, through the cartridge. Depending on the specific treatment to be given the fluid, the cartridge may, for example, include a filter medium for removing particulates or a demineralizer or sorbent for separating ionic or chemical components.

Frequently, the fluid is forced to flow outwardly from the interior to the exterior of the hollow, permeable cartridge. This "inside-out" flow may be the normal direction of flow through the element, because it may have certain advantages. For example, many filters have a graded porosity with the coarsest pores on the upstream portion of the filter and the finest pores on the downstream portion of the filter. If the normal direction of flow is inside-out, the downstream portion of the cartridge where the pores are finest is the exterior portion of the cartridge where the diameter of the cartridge is greatest. This helps to reduce the pressure drop across the finest porosity portion of the filter However, even if the normal direction of flow is "outside-in", the direction of flow may occasionally be reversed. This reversal of the normal outside-in flow may be accidental, e.g., due to a surge in fluid pressure downstream from the element, or it may be intentional, e.g., to flush an accumulated cake of particulate matter from the external surface of the cartridge.

Whenever the fluid flows inside-out through the permeable cartridge, the fluid exerts an outwardly-directed force on the interior of the cartridge. If this force is large enough, the cartridge may distend, distort, rupture, or even burst, thereby reducing the efficiency of the cartridge or even rendering the cartridge totally ineffective. Many high efficiency filter cartridges characterized by low resistance to inside-out flow include a medium of fibers that are not tightly bonded to one another. The force required to distort such a cartridge may be relatively small.

DISCLOSURE OF THE INVENTION

In accordance with one aspect of the invention, an improved fluid treatment element may comprise a permeable cartridge and a permeable wrap. The wrap has inwardly-facing and outwardly-facing surfaces, an end portion, and first and second edge portions which may, for example, be leading and trailing edge portions. The wrap is spirally wound around and completely covers the external surface of the cartridge with the second edge portion overlapping the outwardly-facing surface of the wrap and the inwardly-facing surface of the wrap having a section contiguous with the external surface of the cartridge. In the improved fluid treatment element, the external surface of the cartridge is positively fastened to the contiguous section of the inwardly-facing surface of the wrap, and/or the outwardly-facing surface of the wrap is positively fastened to the overlapping second edge portion of the wrap. The improved fluid treatment element further comprises an end cap disposed at the end of the cartridge, the end cap being secured to the end of the cartridge and the end portion of the wrap.

In accordance with another aspect of the invention, an improved fluid treatment element may comprise a permeable cartridge and a permeable wrap. The wrap includes successive overlapping windings or turns spirally wound about and completely covering the external surface of the cartridge, each individual winding being positively fastened to the external surface of the cartridge and to the previously lapped winding without substantially impairing the permeability of the wrap. The improved fluid treatment element further comprises an end cap disposed at the end of the cartridge, the end cap being secured to the end of the cartridge and the wrap.

The improved fluid treatment elements feature a wrap which has individual windings fixedly secured to the cartridge and/or one another as well as to the end cap. For example, one long wrap may be spirally wound along the entire external surface of the permeable cartridge, one turn partially overlapping the next turn. By winding the wrap around the external surface of the cartridge, the fluid treatment element is better able to withstand the outwardly-directed forces of a fluid flowing inside-out through the element as well as the inwardly-directed forces of a fluid flowing outside-in.

The present invention provides an exceedingly reliable and effective fluid treatment element. For example, with the wrap positively fastened to the cartridge the wrap is prevented from stretching and ballooning away from the cartridge, even after prolonged exposure, to the outwardly-directed forces of a fluid flowing inside-out through the element. Thus, the wrap remains tightly wound around the cartridge, firmly supporting the cartridge against the outwardly-directed forces of the fluid. Further, with the outer surface of the wrap positively fastened to the overlapping edge portion of the wrap, the individual windings of the wrap are individually fastened to one another. Thus, the individual windings are prevented from separating from one another, leaving exposed portions of the cartridge unsupported against the outwardly-directed forces of the fluid.

BEST MODE FOR CARRYING OUT THE INVENTION

Figure 1:
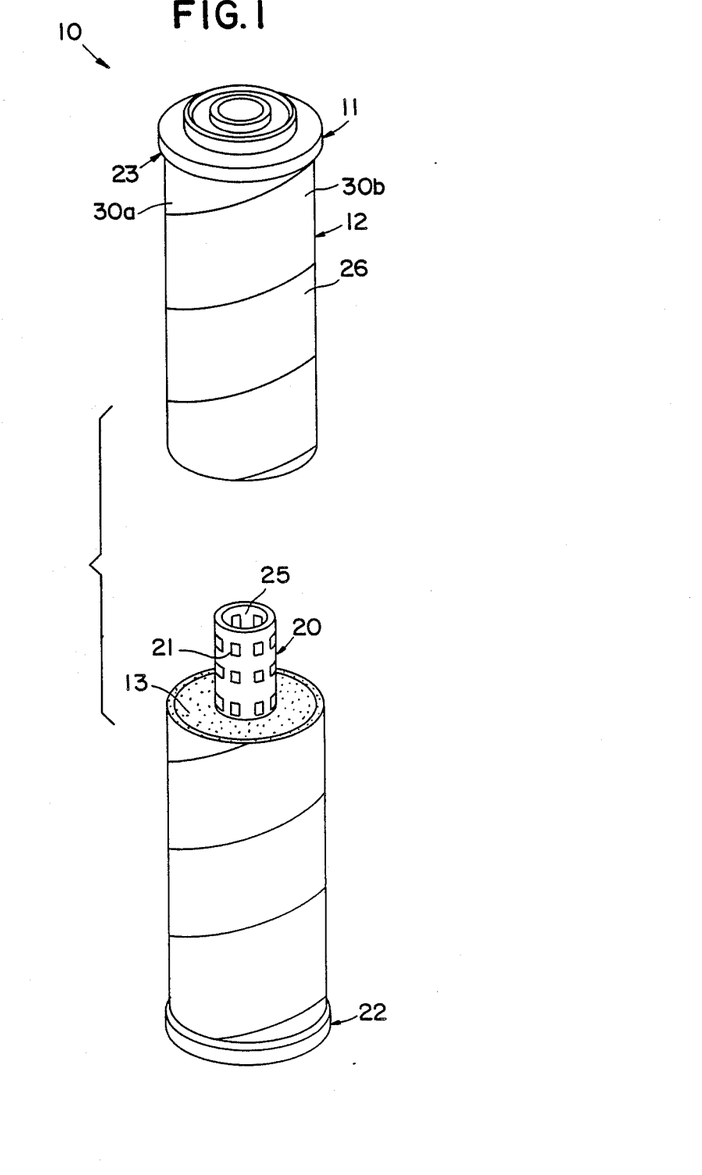
FIG. 1 is an exploded perspective view of a fluid treatment element embodying the invention.
Figure 2:
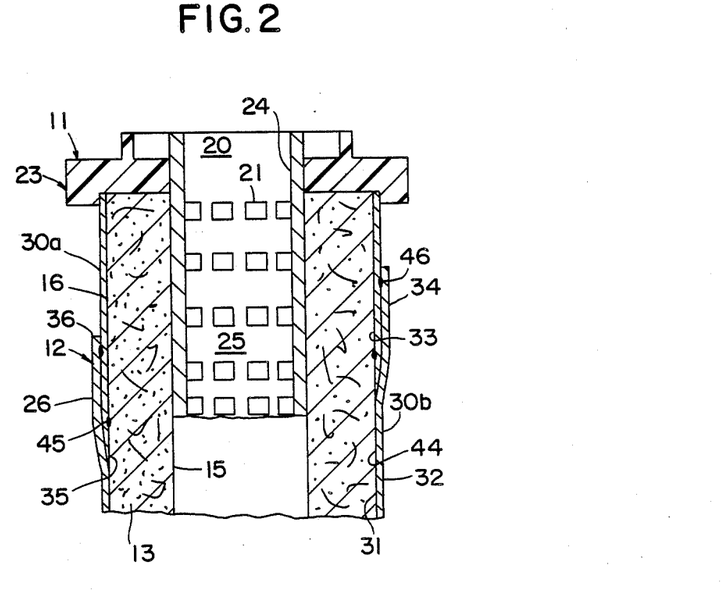
FIG. 2 is a partial sectional view of the fluid treatment element of FIG. 1.

An exemplary fluid treatment element 10 embodying the present invention generally comprises a cartridge 11 and a wrap assembly 12, as shown in FIGS. 1 and 2. The cartridge 11 provides the primary treatment for fluid flowing through the exemplary fluid treatment element 10 while the wrap assembly 12 provides structural support for the cartridge 11. In particular, the wrap assembly provides additional strength, including, for example, additional hoop strength, to resist the various forces exerted on the cartridge 11 by fluids flowing outside-in or inside-out through the exemplary fluid treatment element 10. Additionally, the wrap assembly 12 may provide a pre- or post-treatment of the fluid. At the same time, the wrap assembly 12 should provide as little additional pressure drop as possible. By providing the cartridge 11 with the wrap assembly 23, the exemplary fluid treatment element 10 is surprisingly strong with little sacrifice in efficiency.

The cartridge of the fluid treatment element may be variously configured, depending on the specific treatment to be given the fluid. For example, in the exemplary fluid treatment element 10, the cartridge 11 includes a filter medium 13 for removing particulates from the fluid. Alternatively or additionally, the cartridge may include a demineralizer, such as an ion exchange resin, or a sorbent, such as activated carbon, for separating ionic and other chemical components. In the exemplary fluid treatment element 10, the cartridge 11 has a hollow, generally cylindrical configuration, although it may have any other suitable hollow configuration.

The filter medium 13 of the exemplary fluid treatment element 10 includes an interior surface 15 and an exterior surface 16 and preferably comprises a single layer of a fibrous mass of nonwoven microfibers, such as that available from Pall Corporation under the trademark PROFILE. The microfibers of the PROFILE medium are substantially free of fiber-to-fiber bonding and are secured to each other by mechanical entanglement. The PROFILE medium is a high dirt capacity medium. However, because the fibers are not bonded to one another, the medium lacks sufficient strength to readily resist the outwardly-directed forces exerted on the medium or any significant pressure drop between the inside and the outside of the medium. U.S. Pat. Nos. 4,594,202 and 4,726,901 disclose the PROFILE medium and are incorporated by reference. Alternatively, the cartridge 11 may comprise any other suitable filter medium, multiple layers of a single filter medium, or multiple filter media.

The cartridge 11 of the exemplary fluid treatment element 10 also comprises a tubular core 20 disposed coaxially within and adjacent to the interior surface 15 of the medium 13. The core 20 may be fabricated from any substantially rigid material, for example, a metal or a high strength plastic. Preferably, the core 20 is perforated and, thus, has holes 21 to allow the fluid to pass therethrough. Alternatively, the core may be fabricated from a substantially rigid, fluid-permeable material, for example, a porous metal composite or a wire mesh structure. The core 20 supports the filter medium 13 against pressurized outside-in flow and prevents the element from collapsing inwardly.

The cartridge 11 further comprises a blind end cap 22 and an open end cap 23 positioned at the ends of the filter medium 13 and the core 20. The open end cap 23 includes an opening 24 which communicates with a cavity 25 within the hollow cartridge 11. Alternatively, both end caps may be open end caps, allowing several cartridges to be physically connected end-to-end.

The wrap assembly 12 preferably provides additional strength, in particular, hoop strength, to support the cartridge 11 without any substantial sacrifice in pressure drop. For example, for a cartridge 11 comprising the PROFILE medium and having a 2-3 inch outer diameter, the wrap assembly 12 preferably provides sufficient hoop strength to prevent permanent damage to the cartridge 11 during inside-out flow with a 75 psid pressure drop across the fluid treatment element 10. At the same time the pressure drop across the wrap assembly 12 is preferably less than 10 percent and most preferably less than 5 percent of the pressure drop which would exist across the cartridge if there were no wrap assembly 12.

The wrap assembly 12 includes a permeable wrap 26 spirally wound about the exterior surface 16 of the cartridge 11 in successive windings or turns 30a, 30b. Each winding or turn 30a, 30b comprises a 360 degree revolution of the cartridge 11. Preferably, the wrap 26 may comprise a random non-woven fibrous material, for example, a ribbon of open net material or a regular woven material, and may be fabricated from a variety of materials including polymers, such as polyester, polyamide, polyacrylonitrile, or polyolefins, such as polyethylene or polypropylene. Alternatively, the material may comprise a woven material such as a metal wire or fiberglass cloth which may be coated with a resin such as a polyvinyl chloride (PVC) sheath. In the exemplary fluid treatment element 10, both the wrap 26 and the filter medium 13 may be fashioned from a polyester, from a polypropylene, or from nylon. The wrap may typically be two to four inches wide, although precise dimensions may vary from one application to another.

The externally wound wrap 26 has inner and outer surfaces 31, 32 and leading and trailing edge portions 33, 34, each edge portion 33, 34 including the edge 35, 36 and a section 40, 41 of the wrap 26 adjacent to the edge 35, 36. In winding the wrap 26 onto the filter medium 13, the leading edge portion 33 of one winding 30a is overlapped by the trailing edge portion 34 of the next winding 30b by a predetermined amount, preferably 50 percent of the width of the wrap 26. By overlapping successive windings 30a, 30b, the wrap 26 becomes self-reinforcing. This has the benefit of additional strength and allows the use of a wrapping material that has a relatively low tensile strength. By providing a 50 percent overlap, the filter medium 13 is wrapped with two thicknesses of the wrap 26 with only one pass through the wrapper. This has the benefit of protecting against nonuniformities in the wrapping material. However, the predetermined amount of overlap may vary in different applications.

The wrap further has end portions 42, 43 and a section 44 of the inner surface 31 which is contiguous to a portion of the exterior surface 16 of the cartridge 11. The contiguous section 44 of the inner surface 31 of a given winding 30b comprises the section of the inner surface 31 which is not lapped over the leading edge 32 of a corresponding previous winding 30a.

In accordance with the present invention, each individual winding of the wrap is positively fastened to the cartridge, to a previous winding of the wrap, or to both. For example, an individual winding may be positively fastened to the cartridge, to a previous winding, or to both by means of a solvent or by heat-fusion. In the exemplary fluid treatment element 10, each individual winding 30b is positively fastened to both the cartridge 11 and the previous winding 30b by means of an adhesive. Thus, the wrap assembly 12 further comprises a first adhesive 45 which positively fastens each winding 30a, 30b to the exterior surface 16 of the cartridge 11 and a second adhesive 46 which positively fastens successive overlapped windings 30a, 30b. In the preferred embodiment, the adhesives 45, 46 may each comprise a hot melt resin, and, thus, the same type of material may be used for the wrap, the cartridge, and the adhesives. For example, all may comprise a polyester or a polypropylene.

The first adhesive 45 is generally disposed between the exterior surface 16 of the cartridge 11 and the inner surface 31 of the contiguous section of the wrap 26. Between any two successive windings 30a, 30b, the second adhesive 46 is generally disposed between the outer surface 32 of one winding 30a and the inner surface 31 of the successive winding 30b. The adhesives 45, 46 are preferably applied in relatively thin strips, thus blocking only a negligible amount of the exemplary fluid treatment element 10 from fluid flow. Accordingly, the original permeability of the wrap, i.e., the permeability of the wrap prior to application of the adhesives, is substantially maintained.

Figure 3:
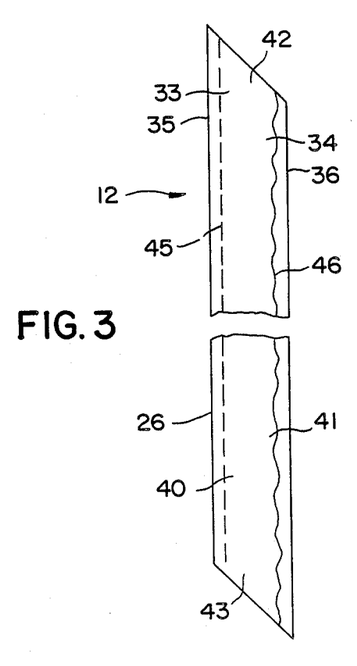
FIG. 3 is a plan view of the wrap of the fluid treatment element of FIG. 1 showing the first adhesive disposed intermittently in a straight line and the second adhesive disposed continuously in a curved line.

More specifically, as shown in FIG. 3, the inner surface 31 of the leading edge portion 33 of the wrap 26 is contiguous to the exterior surface 16 of the cartridge 11. Accordingly, in the exemplary fluid treatment element 10, the first adhesive 45 is preferably disposed between the exterior surface 16 of the cartridge 11 and the inner surface 31 of the leading edge portion 35 of the wrap 26. The second adhesive 46 is preferably disposed between the outer surface 32 of the wrap 26 and the inner surface 31 of the trailing edge portion 34 of the wrap 26. In a preferred embodiment, prior to wrapping the cartridge 11, the first and second adhesives may be extruded on the inner surface 31 of the leading and trailing edge portions 33, 34 of the wrap 26, each within about one-sixteenth inch from the edges 35, 36 of the wrap 26.

An adhesive may penetrate the matrix material of the wrap or cartridge in a direction normal to the cartridge surface, e.g., radially inwardly relative to the cylindrical exemplary fluid treatment element 10. In accordance with a further aspect of the invention, the penetration of the adhesives into the wrap or cartridge is controlled. To maximize fluid flow through the element, some applications rely on lateral fluid flow, i.e., flow whereby the fluid permeates laterally through the element and thus flows within the element generally axially. In standard flow elements, for example, lateral flow allows fluid to enter the interior cavity 25 by flowing along the core 20 until a perforation in the core 20 is found. To optimize lateral flow it may be desirable, in some applications, to control the degree of radial adhesive penetration so fluid may flow laterally through the element behind the adhesive.

Alternatively, in other applications, promotion of radial adhesive penetration may be desirable because this penetration may result in a notably stronger, more integral construction.

Upon contact, the adhesives 45, 46 tend to bond with the wrap 26 or cartridge 11. Depending on several factors, the adhesives may penetrate into the matrix of the materials comprising the wrap 26 or cartridge 11 while the adhesive is setting. These factors include the time necessary for the adhesives to set, the viscosity of the adhesives, and the properties of the wrap or cartridge material. Thus, penetration may be controlled, for example, by coordination in the material choices for the adhesives, wrap, and cartridge. To promote penetration, the adhesive may comprise a low viscosity bonding material while the material comprising the wrap or the cartridge may be a highly sorbent material or a coarse mesh material having large openings. Where hot melt resins are used, penetration can also be promoted by controlling the temperature of the adhesive as it is applied, thereby controlling the adhesive viscosity. The deeper the radial penetration of adhesive into both the wrap and cartridge material matrices, the more integral the bond between the wrap and cartridge. In the exemplary fluid treatment element 10, the adhesive may comprise a polyester hot melt having a viscosity of about 1,500 centipoise at about 450 degrees Fahrenheit or a polypropylene hot melt having a viscosity of about 5,000 centipoise at about 425 degrees Fahrenheit.

In the fluid treatment element of the present invention, proper adhesive penetration is one mechanism by which a solid construction is achieved, the wrap and cartridge comprising positively bonded components of an integral assembly. In service and under the influence of fluid pressures, the wrap and cartridge may respond generally in unison as a single integral structure with the individual wrap windings bonded to the cartridge. The wrap 26 in this integral assembly further provides some degree of axial strength and rigidity to the element.

In one embodiment, radially inward penetration of the second adhesive 46 may be promoted such that the second adhesive 46 penetrates both windings 30a, 30b wrap and contacts and bonds to the cartridge 11. In this embodiment, the second adhesive 46 would serve a dual purpose by positively fastening overlapping edge portions of consecutive windings and, simultaneously, positively fastening both windings 30a, 30b to the cartridge 11. Thus, each winding 30a, 30b would be positively secured to the cartridge 11 in two different places by both the first and second adhesives 45, 46. Accordingly, because individual windings 30a, 30b of the wrap 26 are positively bonded to each other and to the cartridge 11, the accumulation of stretch in a series of consecutive windings is prevented. More intimate contact is maintained between the wrap 26 and cartridge 11, the adhesives 45, 46 providing more effective support. Further, because the cumulative stretch of the wrap 26 may be more effectively controlled, the original percentage overlap in the design of a given fluid treatment element is more effectively maintained.

Additionally, in any externally wound fluid treatment element, either the wrap 26 or cartridge 11 may experience disproportionate local contaminant plugging or weakness caused by local material inhomogeneities. Local material weakness or locally high pressure differentials from plugging may cause a small local failure which leads to the distortion or rupture of the fluid treatment element. In the exemplary fluid treatment element 10, because the wrap 26 is positively fastened to the cartridge 11 along substantially its entire length, the exemplary fluid treatment element 10 is more effective in supporting such locally weak areas.

In the choice of an appropriate adhesive, some considerations include the cost of the adhesive, the chemical compatibility of the fluid and adhesive in the specific application, and the thermal and mechanical properties of the adhesive. The adhesives 45, 46 may comprise a strip of extruded adhesive material, for example, a hot melt resin. As shown in FIG. 3, either adhesive 45, 46 may be disposed in a substantially straight line configuration. Alternatively, the adhesives 45, 46 may have a generally curvilinear configuration. For example, either or both of the adhesives 45, 46 may be disposed in lines having a generally sinusoidal configuration. A curvilinear configuration may be especially feasible where regular woven materials are used for the wrap 26. Such materials provide high hoop strength and cause a lower pressure differential. Where a woven material is used for the wrap, the peak-to-peak amplitude of the curvilinear strip of adhesive is preferably at least twice the spacing of the weave. In this manner, the adhesive will be spread over at least three strands of the weave. The adhesives 45, 46 may be disposed in continuous strips or intermittent strips. For example, the adhesives 45, 46 may be extruded in intermittent line segments or intermittent drops forming a pattern of intermittent dots in the linear or curvilinear configuration. This latter embodiment may be beneficial where a high percentage of unblocked surface area is required.

In accordance with a further aspect of the invention, the end portions 42, 43 of the wrap 26 are secured to the end caps 22, 23. The end caps 22, 23 may be fastened over the ends of the cartridge 11 and wrap assembly 12 in any suitable manner. For example, the ends of the cartridge 11 and the wrap assembly 12 may be secured to the end caps 22, 23 by positioning the ends of the cartridge 11 and the wrap assembly 12 within flanges or grooves in the end caps 22, 23. The ends of the cartridge 11 and the wrap assembly 12 may then be secured to the end caps 22, 23 by any suitable potting material, such as an epoxy adhesive. In the exemplary fluid treatment element 10, the ends of the cartridge 11 and the wrap assembly 12 are preferably secured to the plastic end caps 22, 23 by fusion bonding. An annular ring portion on one side of each end cap 22, 23 is melted. The end of the cartridge 11 and the end portion 42, 43 of the wrap 26 which covers the end of the cartridge 11 is then inserted into the molten ring portion of the end cap, which is then allowed to cool. In this manner, both the cartridge 11 and the wrap assembly 12 are fused to each other and to the end caps 22, 23.

The examples shown below illustrate the advantages of a fluid treatment element according to the present invention.

EXAMPLE 1

A 10 inch long, 2.5 inch diameter medium of polypropylene microfibers was laid in a cylindrical form, as disclosed in U.S. Pat. No. 4,594,202, around a 1.3 inch diameter perforated polypropylene core. The medium and core were fitted with circular, flat, glass-reinforced, polypropylene end caps by fusion bonding.

The cartridge was then tested for its ability to maintain integrity when subjected to inside-out flow at relatively high differential pressures. The cartridge was placed in a transparent filter housing configured such that the fluid entering the housing flowed first to the inside of the core and then radially outwardly through the medium, filling and then exiting the housing. Water was recirculated through the cartridge at a rate of 10 liters per minute. During the recirculation, a suspension containing 2.02 grams per liter of an AICHE test contaminant was injected into the water just upstream from the cartridge at a rate of about 450 milliliters per minute. While the cartridge was challenged with the test contaminant, the pressure drop across the cartridge was monitored and the cartridge was examined visually for damage and points at which leakage of the contaminant might occur.

After 180 minutes of testing, the cartridge had built up a pressure drop of only 1.4 psid from inside to outside and was uniformly discolored from the test contaminant. This indicated that particulate matter was not being removed by the cartridge and was passing via a leakage path through the medium caused by rupture of the cartridge.

EXAMPLE 2

A cartridge identical to that described in Example 1 except that it had no end caps was wrapped with a 3 3/16 inch wide wrap comprising a polypropylene strip available from Midwest Filtration, Inc. under the trade designation Typar 3202. The wrap was wound around the cartridge with a 50 percent overlap at a 7 degree angle to the axis of the cartridge. A polyolefin hot melt adhesive available from H. B. Fuller, Inc. under the trade designation HL6176-X, was applied continuously to the wrap about ⅛ inch from the trailing edge of the wrap as the wrap was being wound around the cartridge. Thus, successive windings of the wrap were positively fastened to one another.

The element was then tested as described in Example 1 except that the concentration of the AICHE contaminant injected into the recirculated water was 1.99 grams per liter.

After only 19 minutes of testing, the pressure drop across the element reached 15.0 psid, indicating that the element was retaining the particulate contaminant and no leakage of the contaminant was observed until then. When the pressure drop across the element reached 15.0 psid, the element yielded, the differential pressure dropping to 13.7 psid and leakage of the contaminant being visually observed at the ends of the element.

EXAMPLE 3

A fluid treatment element identical to that described in Example 2 was capped at each end with circular end caps made of glass-reinforced polypropylene. The ends of the wrap and the ends of the cartridge were embedded within the end caps as disclosed above. The fluid treatment element embodying the invention was then tested as described in Example 1 except that the concentration of the AICHE and contaminant injected into the recirculating water was 2.32 grams per liter.

After 18.3 minutes of testing, the pressure drop across the fluid treatment element rose to 80 psid at which point some outward distortion of the fluid treatment element was noted. However, no passage of the contaminant through the fluid treatment element was observed visually. The rate of recirculation of water through the fluid treatment element was then increased to 18.9 liters per minute and the pressure drop across the fluid treatment element rose to 120 psid at which point the end cap at the bottom of the fluid treatment element cracked.

The results of these three examples are summarized in Table I set forth below. Because differential pressures of 80 psid are seldom reached in actual applications, the fluid treatment element embodying the present invention and tested in Example 3 is shown to maintain its integrity well beyond practical conditions of intended use.

TABLE I

| Filter of Example | Rate of Recirculation (liters/minute) | Maximum Pressure Drop Before Passing Contaminant |
| --- | --- | --- |
| 1 | 10.0 | 1.4 |
| 2 | 10.0 | 15. |
| 3 | 10.0 | 80.* |

TABLE I-continued

| Filter of Example | Rate of Recirculation (liters/minute) | Maximum Pressure Drop Before Passing Contaminant |
|---|---|---|
| 3 | 18.9 | 120. |

* No contaminant released at 80 psid.

In one anticipated application of the exemplary fluid treatment element 10, a precoat demineralizer may be applied to the exterior of the exemplary fluid treatment element 10 and used in the treatment of cooling water from the condenser stage of a nuclear power plant. In order to eliminate minerals from the water supply in such a system, the water is both filtered and demineralized when it is passed through the fluid treatment element 10 with the precoat demineralizer.

The exemplary fluid treatment element 10 is coated with the precoat demineralizer by passing a slurry or suspension comprising ion exchange resin particles through the element 10 and depositing a coating of the ion exchange resin on the exterior surface of the element 10. Once the precoat demineralizer has been applied to the element 10, water from the condenser stage of the nuclear power plant is passed outside-in through the exemplary fluid treatment element 10. The filter medium 13 filters particulates from the water while the resin particles function as an ion exchange bed, reacting with and removing certain minerals in the water. The wrap assembly 12, with its substantial hoop strength, supports and stabilizes the demineralizer coating and prevents it from cracking or chipping which might otherwise allow fluid bypass or collapse the element.

After a given quantity of water has been treated, the resin is exhausted and the element 10 is subjected to a backwash operation where the spent resin is removed from the surface of the element 10 and discarded. The element is then coated with a fresh suspension of the ion exchange resin and the treatment process is resumed. The wrap 26 provides external support to the filter medium 13 during the backwash operation. For example, it strengthens the element, preventing a long element, e.g., a 70 inch element, from bowing and thus losing the seal at the gasket at the end of the element. The element 10 may also serve as a prefilter layer which captures large particles and prevents clogging of the filter medium 13 by the ion exchange particles.

The examples set forth below illustrate this application of the fluid treatment element and demonstrate that a fluid treatment element embodying the invention additionally provides support even for outside-in flow.

EXAMPLE 4

A 70 inch long, 2 inch diameter cartridge composed of polypropylene microfibers was laid as disclosed in U.S. Pat. No. 4,594,202 in a cylindrical form around a 1.3 inch diameter polypropylene core reinforced with 40 percent fiberglass. The cartridge was fusion bonded on one end to a blind end cap and on the other end to an end cap open in the center.

The cartridge was fitted into a transparent housing and coated on the external surface with a mixture of cellulose fiber and powdered ion exchange resin, in particular, an ion exchange resin available from Epicor, Inc. under the trade designation Epifloc 2lH. This precoat layer was formed by recirculating the ionized water at a rate of 6 gallons per minute from the outside to the inside of the cartridge while a slurry of 953.4 grams of the powdered ion exchange resin in 3,000 milliliters of water was injected into the water stream just upstream of the cartridge. Injection took place at an even rate over a period of about 30 minutes. After the injection of the powdered ion exchange resin was complete, the rate of recirculation was increased to 12 gallons per minute and maintained at that rate for 10 minutes. This ensured that any fines present in the powdered ion exchange resin would be ultimately retained in the precoat.

While maintaining the outside-in flow, the effluent of the cartridge was then directed to a drain and the cartridge was challenged with a suspension of 80 parts per million of AC Fine Test Dust in deionized water at a flow rate of 12 gallons per minute. This challenge was maintained at this flow rate until the differential pressure across the reached 80 psid.

It was observed that the cartridge began to deform substantially when the differential pressure reached 64 psid. The deformation became increasingly severe as the differential pressure increased to 80 psid. As a consequence of the deformation, the cartridge began to bend and bow outward, allowing fluid bypass through the cartridge and contamination of the effluent. In addition, severe bending causes the cartridge to brush against the housing (or presumably other filters which may be present in multi-element housing) abrading some of the precoat and again allowing contaminants to pass through the cartridge in these areas.

EXAMPLE 5

A 70 inch long, 2 inch diameter cartridge identical to that used in Example 4 was wrapped with a 3 3/16 inch wide wrap comprising a polypropylene material available from Midwest Filtration, Inc. under the trade designation Typar 3151. The cartridge was wrapped at a 7 degree angle with respect to the cartridge and with an overlap of 50 percent. The ends of the wrap and the ends of the cartridge were embedded into the end caps as set forth above. As the wrap was being applied to the cartridge, a strip of a polypropylene hot melt adhesive available from H. B. Fuller, Inc. under the trade designation HL6l76-X was applied to the inside surface of the wrap about ⅛ inch from the trailing edge, thereby bonding the individual windings of the wrap to one another.

This fluid treatment element embodying the invention was then tested as described in Example 4. No deformation whatsoever was observed in the fluid treatment element, even when the differential pressure across the fluid treatment element reached 80 psid.

The particular embodiments described above are intended by way of example only. Therefore, it is to be understood that the invention is not limited to these examples. Alternative embodiments and modifications which would still be encompassed by the invention may be made by those skilled in the art, particularly in light of the foregoing teachings. Therefore, the appended claims are intended to cover any alternative embodiments, modifications, or equivalents which may be included within the spirit and scope of the invention as claimed.

We claim:

1. A fluid treatment element comprising:
    a permeable cartridge comprising a substantially rigid fluid permeable tubular core and disposed thereon a cylindrical, nonwoven mass of polymeric microfibers substantially free of fiber-to-fiber bonding and secured to each other by mechanical entanglement of the fibers, said cartridge having an external surface and an end;

a permeable wrap spirally wound about and completely covering the external surface of the cartridge and having inner and outer surfaces, first and second edge portions, and an end portion, the second edge portion of the wrap overlapping the outer surface of the wrap and the inner surface of the wrap having a section contiguous to the external surface of the cartridge;

first means for positively fastening the external surface of the cartridge to the contiguous section of the inner surface of the wrap;

second means for positively fastening the outer surface of the wrap and the overlapping second edge portion of the wrap; and an end cap disposed at the end of the cartridge and including means for securing the end of the cartridge and the end portion of the wrap to the end cap.

2. A fluid treatment element according to claim 1 wherein the first fastening means comprises a first adhesive disposed between the external surface of the cartridge and the contiguous section of the inner surface of the wrap and wherein the second fastening means comprises a second adhesive disposed between the outer surface of the wrap and the overlapping second edge portion of the wrap.

3. A fluid treatment element according to claim 2 wherein the first and second edge portions each comprise an edge and a section of the wrap adjacent to the edge and wherein the first and second adhesives are each disposed at about one-sixteenth inch of the first and second edges.

4. A fluid treatment element according to claim 2 wherein the cartridge, the wrap, and the first and second adhesives comprise substantially the same material.

5. A fluid treatment element according to claim 2 wherein the first and second adhesives each comprise a strip of extruded adhesive material.

6. A fluid treatment element according to claim 5 wherein the strips of extruded adhesive material comprise a hot melt resin.

7. A fluid treatment element according to claim 5 wherein the first and second adhesives are disposed along the inner surface of the first and second edge portions, respectively, of the wrap.

8. A fluid treatment element according to claim 2 wherein one of the first and second adhesives comprises a strip of adhesive material having a substantially straight line configuration.

9. A fluid treatment element according to claim 2 wherein one of the first and second adhesives comprises a strip of adhesive material having a substantially curvilinear configuration.

10. A fluid treatment element according to claim 2 wherein one of the first and second adhesives comprises a substantially continuous strip of adhesive material.

11. A fluid treatment element according to claim 2 wherein one of the first and second adhesive comprises an intermittent strip of adhesive material.

12. A fluid treatment element according to claim 1 wherein the cartridge includes a filter medium.

13. A fluid treatment element according to claim 1 further comprising a precoat demineralizer.

14. A fluid treatment element according to claim 1 wherein the end of the cartridge is fusion bonded to the end portion of the wrap.

15. A fluid treatment element comprising:
a permeable cartridge comprising a substantially rigid fluid permeable tubular core and disposed thereon a cylindrical, nonwoven mass of polymeric microfibers substantially free of fiber-to-fiber bonding and secured to each other by mechanical entanglement of the fibers, said cartridge having an external surface and an end;

a permeable wrap having successive overlapping windings spirally wound about and completely covering the external surface of the cartridge;

an end cap disposed at an end of the cartridge and including means for securing the end of the cartridge and the wrap to the end cap; and and means for positively fastening each individual winding both to the cartridge and to a previous lapped winding without substantially impairing the permeability of the wrap.

16. A fluid treatment element according to claim 15 wherein the wrap has an inner surface a portion of which is contiguous to the external surface of the cartridge and wherein the fastening means comprises first and second adhesives, the first adhesive being disposed between the external surface of the cartridge and the contiguous portion of the inner surface of the wrap and the second adhesive being disposed between successive overlapping windings of the wrap.

17. A fluid treatment element according to claim 16 further comprising a means for controlling penetration of the first and second adhesives into the cartridge and the wrap.

18. A fluid treatment element according to claim 17 wherein the first and second adhesives comprise materials having a predetermined viscosity.

19. A fluid treatment element comprising:
a permeable cartridge comprising a substantially rigid fluid permeable tubular core and disposed thereon a cylindrical, nonwoven mass of polymeric microfibers substantially free of fiber-to-fiber bonding and secured to each other by mechanical entanglement of the fibers, said cartridge having an external surface and an end;

a permeable wrap spirally wound about and completely covering the external surface of the cartridge and having inner and outer surfaces, first and second edge portions, and an end portion, the second edge portion of the wrap overlapping the outer surface of the wrap and the inner surface of the wrap having a section contiguous to the external surface of the cartridge;

means for positively fastening the external surface of the cartridge to the contiguous section of the inner surface of the wrap; and an end cap disposed at the end of the cartridge and including means for securing the end of the cartridge and the end portion of the wrap to the end cap.

20. A fluid treatment element according to claim 19 in which the means for positively fastening the external surface of the cartridge to the contiguous sections of the inner surface of the wrap is also effective to positively fasten the outer surface of the wrap to the overlapping portion of the wrap through penetration of the means through the wrap material.

21. A fluid treatment element comprising:

a permeable cartridge comprising a substantially rigid fluid permeable tubular core and disposed thereon a cylindrical, nonwoven mass of polymeric microfibers substantially free of fiber-to-fiber bonding and secured to each other by mechanical entanglement of the fibers, said cartridge having an external surface and an end;

a permeable wrap spirally wound about and completely covering the external surface of the cartridge and having inner and outer surfaces, first and second edge portions, and an end portion, the second edge portion of the wrap overlapping the outer surface of the wrap and the inner surface of the wrap having a section contiguous to the external surface of the cartridge;

means for positively fastening the outer surface of the wrap to the overlapping second edge portion of the wrap; and an end cap disposed at the end of the cartridge and including means for securing the end of the cartridge and the end portion of the wrap to the end cap.

* * * * *